(12) United States Patent
Kung et al.

(10) Patent No.: US 9,152,627 B2
(45) Date of Patent: Oct. 6, 2015

(54) AUTOMATIC RULE GENERATION

(71) Applicants:David Kung, Cupertino, CA (US); Min He, San Jose, CA (US); Mengdan Ma, Berkeley, CA (US)

(72) Inventors: David Kung, Cupertino, CA (US); Min He, San Jose, CA (US); Mengdan Ma, Berkeley, CA (US)

(73) Assignee: Business Objects Software Ltd, Dublin (IE)

( * ) Notice: Subject to any disclaimer, the term of this patent is extended or adjusted under 35 U.S.C. 154(b) by 146 days.

(21) Appl. No.: 13/623,719

(22) Filed: Sep. 20, 2012

(65) Prior Publication Data

US 2014/0081931 A1 Mar. 20, 2014

(51) Int. Cl.
*G06F 17/00* (2006.01)
*G06F 17/30* (2006.01)

(52) U.S. Cl.
CPC ............ *G06F 17/30* (2013.01); *G06F 17/3051* (2013.01)

(58) Field of Classification Search
CPC .................. G06F 17/30303; G06F 17/30371; G06F 17/3051; G06F 17/30
USPC .......................................... 707/694, E17.005
See application file for complete search history.

(56) References Cited

U.S. PATENT DOCUMENTS

| 6,604,110 | B1* | 8/2003 | Savage et al. ................. 707/602 |
| 7,873,671 | B2* | 1/2011 | Barsness et al. .............. 707/802 |
| 2005/0108324 | A1* | 5/2005 | Stritzinger et al. ........... 709/203 |
| 2005/0131913 | A1* | 6/2005 | Barsness et al. .............. 707/100 |
| 2005/0198048 | A1* | 9/2005 | Barsness et al. .............. 707/100 |
| 2009/0092318 | A1* | 4/2009 | Berard et al. ................. 382/176 |
| 2009/0319487 | A1* | 12/2009 | Carlin et al. ..................... 707/3 |
| 2010/0161616 | A1* | 6/2010 | Mitchell ....................... 707/741 |
| 2013/0066801 | A1* | 3/2013 | Phillips ....................... 705/36 R |
| 2013/0166515 | A1* | 6/2013 | Kung et al. ................... 707/690 |

* cited by examiner

*Primary Examiner* — Phong Nguyen
(74) *Attorney, Agent, or Firm* — Schwegman Lundberg & Woessner, P.A.

(57) ABSTRACT

In an example embodiment, a method of automatically generating data validation rules from data stored in a column of a table is provided. Outliers for the data are determined by analyzing a profiling statistic for the data, the profiling statistic having a type. Then it is determined if a predefined limit is exceeded, based on a quantity of the outliers determined for the data through the analysis of the profiling statistic. A data validation rule is then automatically generated based on non-outliers detected in the data through the analysis of the profiling statistic, the generated data validation rule also being based on the type of the profiling statistic. The data validation rule can then be applied to data subsequently entered for the column, causing at least a portion of the data subsequently entered for the column to be rejected.

19 Claims, 7 Drawing Sheets

AUTOMATIC RULE GENERATION

TECHNICAL FIELD

This document generally relates to systems and methods for use with enterprise resource planning. More specifically, this document relates methods and systems for automatic rule generation.

BACKGROUND

Enterprise resource planning (ERP) systems allow for the integration of internal and external management information across an entire organization, including financial/accounting, manufacturing, sales and service, customer relationship management, and the like. The purpose of ERP is to facilitate the flow of information between business functions inside the organization and management connections to outside entitles. Data with ERP, however, may not always be valid. For example, for an employee record, there may be a number of fields, including social security number, address, and postal code. Through profiling, it may be discovered that some of these fields have bad information, or at least are suspected to have bad information due to the patterns of data in all employee records. In one example, the country listed for addresses for some employees may be suspected as bad data if the values for the country field are outliers. If, for example, 30% of the employee records list USA as the country, 30% list CAN (for Canada), and 33% list JAP (for Japan), then if less than 1% list "USS" and "XX", then those records listing USS or XX may be viewed as potentially bad data, either through typographical errors during input (e.g., the user meant to type USA instead USS), or through intentionally leaving a placeholder (e.g., user put "XX" because the country was unknown). In such cases, it is beneficial to clean up this bad data and prevent future records from having such bad values entered on them. Validation rules can be used to do this, but currently validation rules require a lot of manual effort.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, validation rules for data are automatically generated through profiling. Outliers are detected by examining patterns of data and selecting values that are not repeated enough in the full data set to exceed a predetermined threshold. Validation rules may also be automatically created by comparing distinct values having similar distributions. Once these validation rules are automatically created, they can be used to prevent future data entry from entering data identified as bad or incorrect.

While the following description will describe various embodiments related to an enterprise resource planning (ERP) system, one of ordinary skill in the art will recognize that the claims should not be limited to merely ERP embodiments, as the solution described herein could apply to other systems such as Customer Relationship Management (CRM) systems, Supplier Relationship Management systems (SRM), and general databases.

Figure 1:
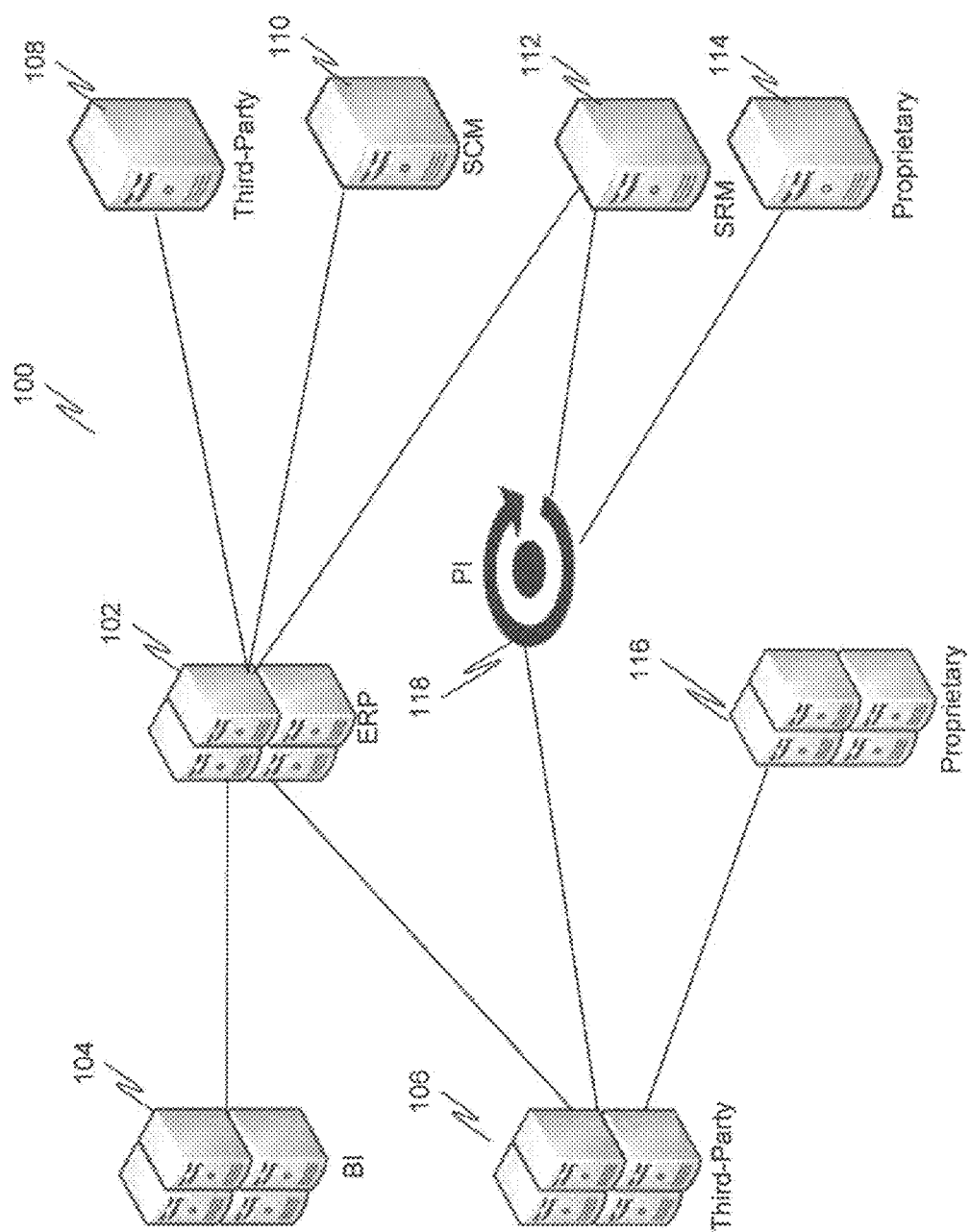
FIG. 1 depicts an application landscape, in accordance with an example embodiment.

FIG. 1 depicts an application landscape, in accordance with an example embodiment. The application landscape 100 comprises different heterogeneous software and/or hardware components 102 to 116, which are connected together in the application landscape 100 to process, for example, a business scenario. The application landscape 100 may comprise an enterprise resource planning (ERP) system 102. The ERP 102 may integrate internal and external management information across an entire organization, embracing different activities and/or services of an enterprise. The ERP system 102 automates the activities and/or services with an integrated computer-based application. The ERP system 102 can run on a variety of hardware and/or network configurations, typically employing a database to store its data. The ERP system 102 may be associated with (e.g. directly or indirectly connected to and/or in (networked) communication with) a business intelligence (BI) component 104, one or more third parties 106 and 108, a supply chain management (SCM) component 110, and/or a SRM component 112. The SRM 112 and/or the SCM 110 may further be associated with at least one proprietary service 114. Furthermore, at least one of the third parties 106 may also be associated with at least one proprietary service 116. The BI component 104 may provide historical, current, and predictive views of business processes and/or business scenarios, for example, performed on the ERP 102. Common functionality of business intelligence technologies may comprise reporting, online analytical processing, analytics, data mining, business performance management, benchmarking, text mining, and/or predictive analytics. The functionality may be used to support better decision making in the ERP system 102. The SCM component 110 may manage a network of interconnected businesses involved in the provision of product and/or service packages required by end consumers such as the ERP system 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP system 102

(e.g., to maximize the potential value of those relationships). All of these systems may be integrated via a process integration component 118.

Figure 2:
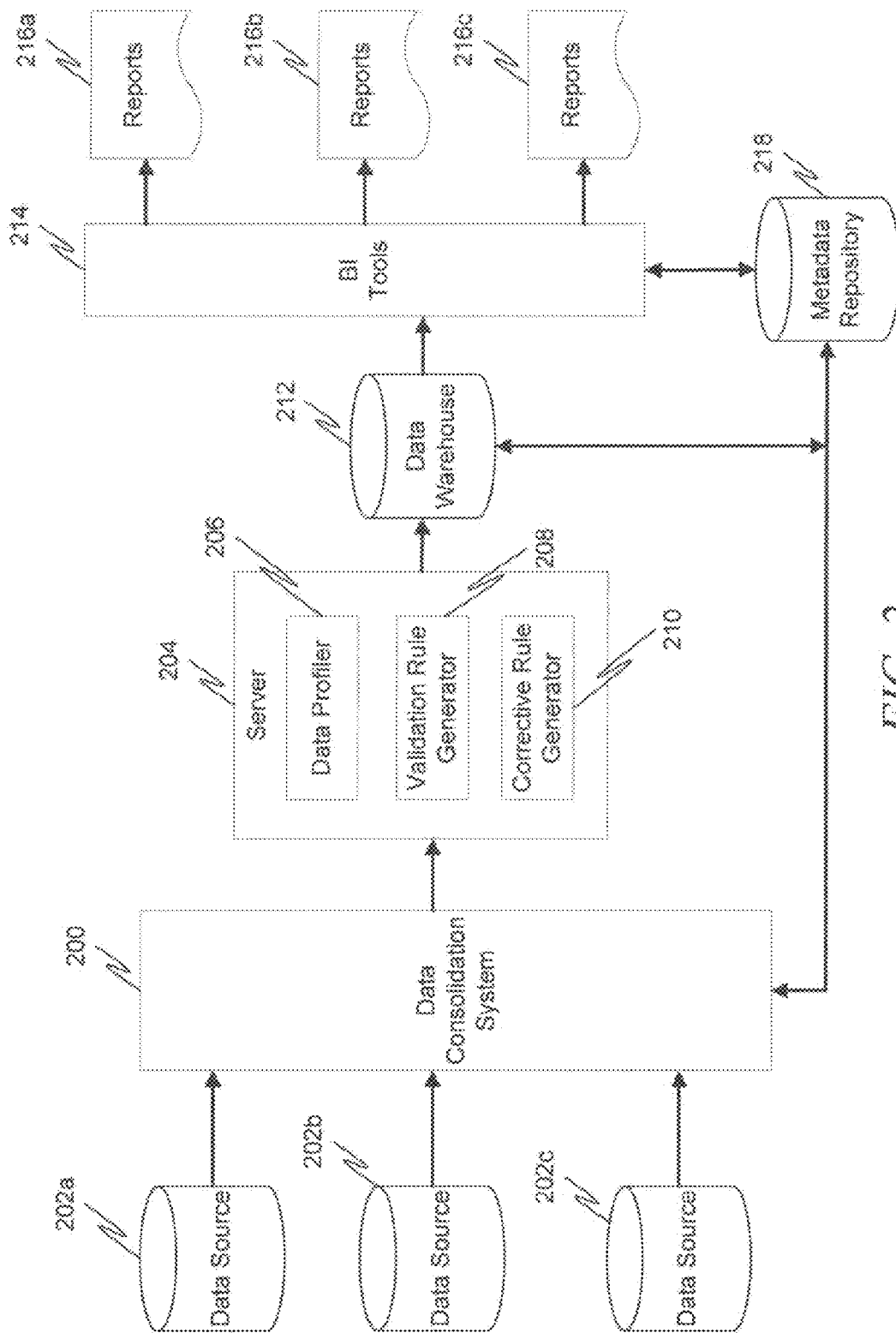
FIG. 2 is a diagram illustrating an architecture of an ERP system in accordance with an example embodiment.

FIG. 2 is a diagram illustrating an architecture of an ERP system in accordance with an example embodiment. A data consolidation system 200 gathers data from one or more data sources 202a-202c. A server 204 may contain a data profiler 206 that profiles the data gathered by the data consolidation system 200, and a validation rule generator 208 that can automatically generate validation rules based on this profiling. This process will be described in more detail later. A corrective rule generator 210 may also be present to automatically generate corrective rules based on the profiling. The data can be stored in a data warehouse 212. Business intelligence (BI) tools 214 can operate on the data to run reports 216a-216c. The BI tools 214 can also utilize a metadata repository 218 to run these reports. The data consolidation system 200 can also utilize the stored validation rules from the data warehouse 212 bad data (or even correct the bad data).

In an example embodiment, an approach is taken where the existence of outlier values in a dataset is used as an indicator to create a validation rule automatically. An outlier is an observation that is numerically distant from the rest of the data. In an example embodiment, five different profiling statistics are analyzed for the existence of outliers. These profiling statistics are:

(1) The percentage of null values
(2) The percentage of blank values
(3) The percentage of zero values
(4) Oats value distribution
(5) Data pattern distribution If an outlier is detected for any of these profiling statistics for any column in a table of data, than this column is a candidate for having a new validation rule to be applied. The methodology for detecting outliers for each of these profiling statistics may vary. In an example embodiment, a Grubbs' test computation, also known as a maximum normed residual test, is used for finding outliers in data value distribution and data pattern distribution.

Grubbs' detects one outlier at a time. This outlier is expunged from the dataset and the test is iterated until no outliers are detected.

Grubbs' test is defined for the hypothesis:
$H_0$: There are no outliers in the data set
$H_a$: There is at least one outlier in the data set
The Grubbs' test statistic is defined as:

$$G = \frac{\max_{i=1,\ldots,N} |Y_i - \bar{Y}|}{s}$$

with $\bar{Y}$ and s denoting the sample mean and standard deviation, respectively. The Grubbs test statistic is the largest absolute deviation from the sample mean in units of the sample standard deviation.

This is the two-sided version of the test. The Grubbs test can also be defined as a one-sided test. To test the minimum value is an outlier, the test statistic is $$G = \frac{\bar{Y} - Y_{min}}{s}$$

with $Y_{min}$ denoting the minimum value. To test whether the maximum value is an outlier, the test static is $$G = \frac{Y_{max} - \bar{Y}}{s}$$

with $Y_{max}$ denoting the maximum value.

For the two-sided test, the hypothesis of no outliers is rejected at significance level $\alpha$ if $$G > \frac{N-1}{\sqrt{N}} \sqrt{\frac{t^2_{\alpha/(2N), N-2}}{N-2+t^2_{\alpha/(2N), N-2}}}$$

with $t_{\alpha/(2N), N-2}$ denoting the upper critical value of the t-distribution of $N-2$ degrees of freedom and a significance level of $\alpha/(2N)$. For the one-sided tests, $\alpha/(2N)$ is replaced with $\alpha/N$.

An alternative to the Grubbs' test is the Tietjen-Moore test. The Tietjen-Moore test is a generalization of the Grubbs' test to the case of multiple outliers.

The Tietjen-Moore test is defined for the hypothesis:
$H_0$: There are no outliers in the data set
$H_a$: There are exactly k outliers in the data set
Test Statistic Sort the n data points from smallest to the largest so the $y_i$ denotes the ith largest data value.
The test statistic for the k largest points is $$L_K = \frac{\sum_{i=1}^{n-k}(y_i - \bar{y}_k)^2}{\sum_{i=1}^{n}(y_i - \bar{y})^2}$$

with $\bar{y}$ denoting the sample mean for the full sample and $\bar{y}_k$ denoting the sample mean with the largest k points removed.

The test statistic for the k smallest points is $$L_K = \frac{\sum_{i=k+1}^{n}(y_i - \bar{y}_k)^2}{\sum_{i=1}^{n}(y_i - \bar{y})^2}$$

with $\bar{y}$ denoting the sample mean for the full sample and $\bar{y}_k$ denoting the sample mean with the smallest k points removed.

To test for outliers in both tails, compute the absolute residuals $$r_i = |y_i - \bar{y}|$$

and then let $z_i$ denote the $y_i$ values sorted by their absolute residuals in ascending order. The test statistic for this case is $$E = \frac{\sum_{i=1}^{n-k}(z_i - \bar{z}_k)^2}{\sum_{i=1}^{n}(z_i - \bar{z})^2}$$

with $\bar{z}$ denoting the sample mean for the full data set and $\bar{y}_k$ denoting the sample mean with the largest k points removed.
$H_0$: There are no outliers in the data set
$H_a$: There are up to r outliers in the data set
Test Statistic: Compute $$R_i = \frac{\max_i |x_i - \bar{x}|}{s}$$

with $\bar{x}$ and s denoting the sample mean and sample standard deviation, respectively.

Remove the observation that maximizes $|x_i - \bar{x}|$ and then recompute the above statistic with n−1 observations. Repeat this process until r observations have been removed. This result in the r test statistics $R_1, R_2, \ldots R_r$.

Significance $\alpha$.
Level:
Critical Corresponding to the r test statistics, compute the
Region: following r critical values $$\lambda_i = \frac{(n-1)t_{p,n-i-1}}{\sqrt{(n-i-1+t^2_{p,n-i-1})(n-i+1)}}$$

where i=1, 2, ..., $t_{p,v}$ is the 100p percentage point from the t distribution with v degrees of freedom and $$p = 1 - \frac{\alpha}{2(n-i+1)}$$

The number of outliers is determined by finding the largest i such that $R_1 > \lambda_i$.

Another alternative to the Grubbs test is the Generalized Extreme Studentized Deviate (ESD) Test. The ESD test is essentially the Grubbs' test applied sequentially. Given the upper bound, r, the generalized ESD test essentially performs r separate tests; a test for one outlier, a test for two outliers, and so on up to r outliers.

The generalized ESD test is defined for hypothesis: Null value, blank value, and zero value can be detected as outliers if the number of occurrences of these values is below a certain threshold percentage.

Data pattern distribution is useful to detect patterns that do not match typical patterns. For example, if the column is for a Social Security number, examining the data pattern distribution will detect when some of the values have fewer than 9 or greater than 9 digits, both indicating some sort of problem.

In an example embodiment, for each column in a table, the outlier test is run against each of the five profiling statistics. After the outlier tests are complete, the system can display a list of auto-generated rules to the user. The system can also display the columns that these auto-generated rules should be applied to. The user can then approve, reject, or modify the list of auto generated rules.

Figure 3:
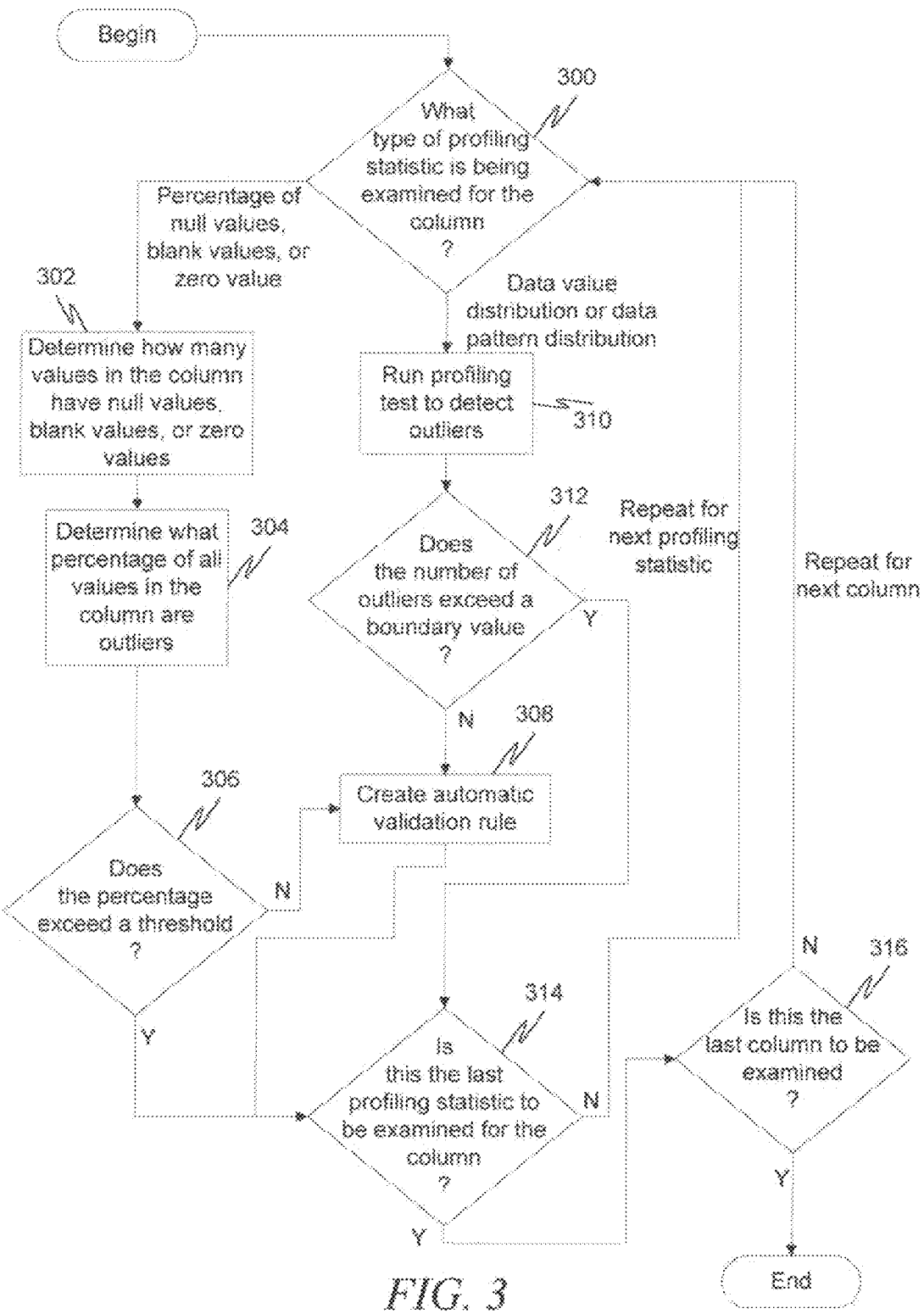
FIG. 3 is a flow diagram illustrating a process for automatic rule generation in accordance with an example embodiment.

FIG. 3 is a flow diagram illustrating a process for automatic rule generation in accordance with an example embodiment. First, a column of data is profiled to locate outliers. This may involve running tests to examine outliers in the five profiling statistics described above. Of course, it is not mandatory that all five profiling statistics be investigated. In some embodiments, fewer or more profiling statistics may be investigated. The process may involve looping through the various profiling statistics for each column to be examined. At 300, it is determined if a profiling statistics to be examined for the column is the percentage of null values, the percentage of blank values, the percentage of zero values, data value distribution, or data pattern distribution. If it is the percentage of null values, the percentage of blank values, or the percentage of zero values then at 302 it is determined how many values in the column have null values, blank values, or zero values (depending upon which profile statistic is being examined). Such values are deemed to be outliers. At 304, it is determined what percentage of all values in the column are outliers (contain null, blank, or zero values, depending upon the profile statistic being examined).

At 306, it is determined if the percentage of all values in the column that are outliers exceeds a predetermined threshold. If so, it is assumed that these outliers are, in fact, correct data. If not, however, then an automatic validation rule is created at 308. The creation of an automatic validation rule will be described in more detail later. The predetermined threshold may be determined by, for example, a user.

If at 300 it was determined that the profiling statistic to be examined is data value distribution or data pattern distribution, then a profiling test can be run to detect outliers at 310. As stated above, this profiling test may include a Grubbs' test, a Tietjen-Moore Test, or an ESD Test.

At 312, it is determined if the number of outliers detected is greater than a predetermined boundary value. If so, it is assumed that these outliers are, in fact, correct data. If not, however, then at 308 the automatic validation rule can be created.

The automatic rules created in 308 will vary based on the profiling statistic being examined. In an example embodiment, rules may be created according to the following table:

| Profiling Statistic | Rule |
| --- | --- |
| Percentage of null | $value is not null |
| Percentage of blank | Length($value) > 0 |
| Percentage of zero | $value > 0 |
| Data value distribution | $value in (...) |
| Data pattern distribution | $value match_pattern( ) or $value match_pattern( )... |

At 314, it is determined if this is the last profiling statistic to be examined for the column. If not, then the process loops to 300 for the next profiling statistic to be examined. If so, then at 316 it is determined if this is the last column to be examined. If not, then the process loops to 300 for the next column. If so, then the process ends.

As an example, assume that a country column of a customer table has the following value distribution: 30% of the employee records list USA as the country, 30% CAN (for Canada), and 33% list JAP (for Japan), 5% list CHN (for China), 1% "USS," and 1% list "XX." Here, the percentage of null, percentage of blank, and percentage of zero profile statistics will each yield 0%, because none of the values are described as being null, blank, or zero. The data value distribution profile statistics, however, would yield "USS", "XX", and possibly "CHN" as outliers ("CHN" may be borderline and its inclusion as an outlier would depend on the precise test used to examine this profile statistic). Assuming the number of outliers does not exceed the boundary value, the automatic rule creation would then create a rule stating that the value for "country" must be within the group of non-outliers as defined by the test. Thus, the rule may be created as $country in ("USA," "CAN") (CHN would be included too if it was not considered an outlier). Of course, one value of showing the rule to the user before implementing the rule is that it allows the user to override what may be incorrect rule. For example, if the rule generated is $country in ("USA," "CAN"), the user may recognize that China was left out and may modify the rule to read $country in ("USA," "CAN," "CHN") prior to it being implemented.

It should be noted that while five profiling statistics are described above, there may be other ways to profile the data to determine bad data (other than merely outliers). In one example, a master table may refer to a secondary table. For example, a master table may describe products as such:

| ID | Description |
| --- | --- |
| 100 | Widget 1 |
| 101 | Widget 2 |
| 102 | Widget 3 |
| 103 | Widget 4 |
| 104 | Widget 5 |

Whereas a secondary table may describe sales orders involving products as such:

| Order | ID | Units |
| --- | --- | --- |
| 1 | 100 | 5 |
| 2 | 103 | 2 |
| 3 | 100 | 6 |
| 4 | 100 | 1 |
| 5 | 102 | 3 |

One potential source of bad data consists of the fact that it is possible that one of the values in the secondary table column pertaining to the master table (here, the product ID column) may, in fact, not be a valid value in the master table. For example, there may be a product ID listed in the secondary table that is not contained in the master table.

Profiling then involves, for a particular column of a table, first attempting to located a master table for that column. This can be accomplished by assembling a list of the unique values contained in the column, and then looking for a table containing at least a predefined percentage of these unique values (i.e., a threshold percentage). Once the mast table is identified, a rule can be created indicating that the values in the column of the secondary table must be values that are also contained in the master table.

The profiling then involves first determining which table is a master table (by, for example, looking for a column in a table that contains unique values, i.e., values that do not repeat). This process may be called "master table profiling."

Figure 4:
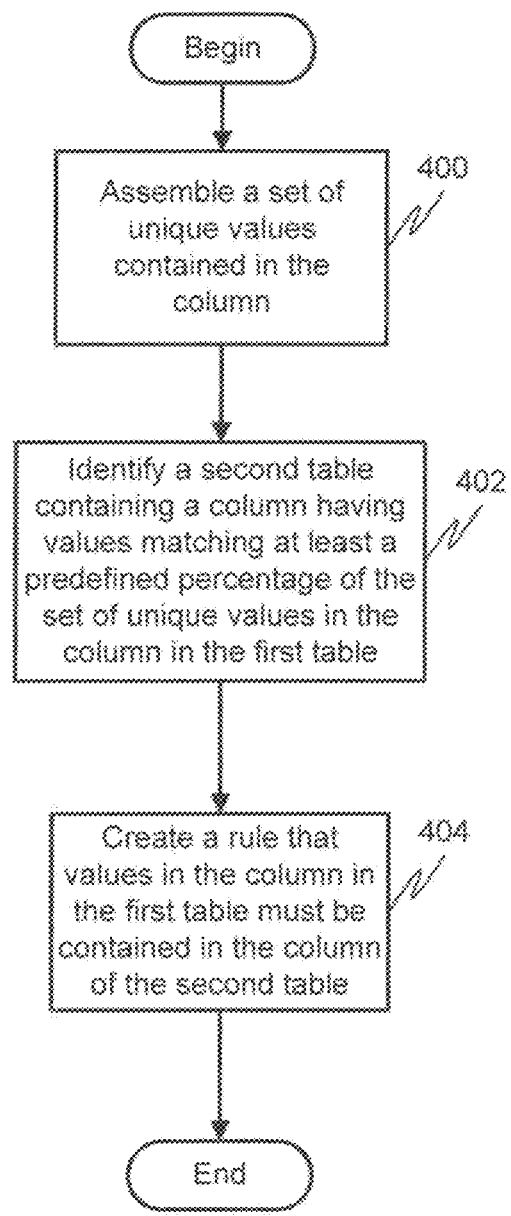
FIG. 4 is a flow diagram illustrating a method for master table profiling in accordance with an example embodiment.

FIG. 4 is a flow diagram illustrating a method for master table profiling in accordance with an example embodiment. This process is applied to a column in a first table. At 400, a set of unique values contained in the column is assembled. At 402, a second table containing a column having values matching at least a predefined percentage of the set of unique values in the column in the first table is identified. At 404, a rule is created that values in the column in the first table must be contained in the column of the second table.

Figure 5:
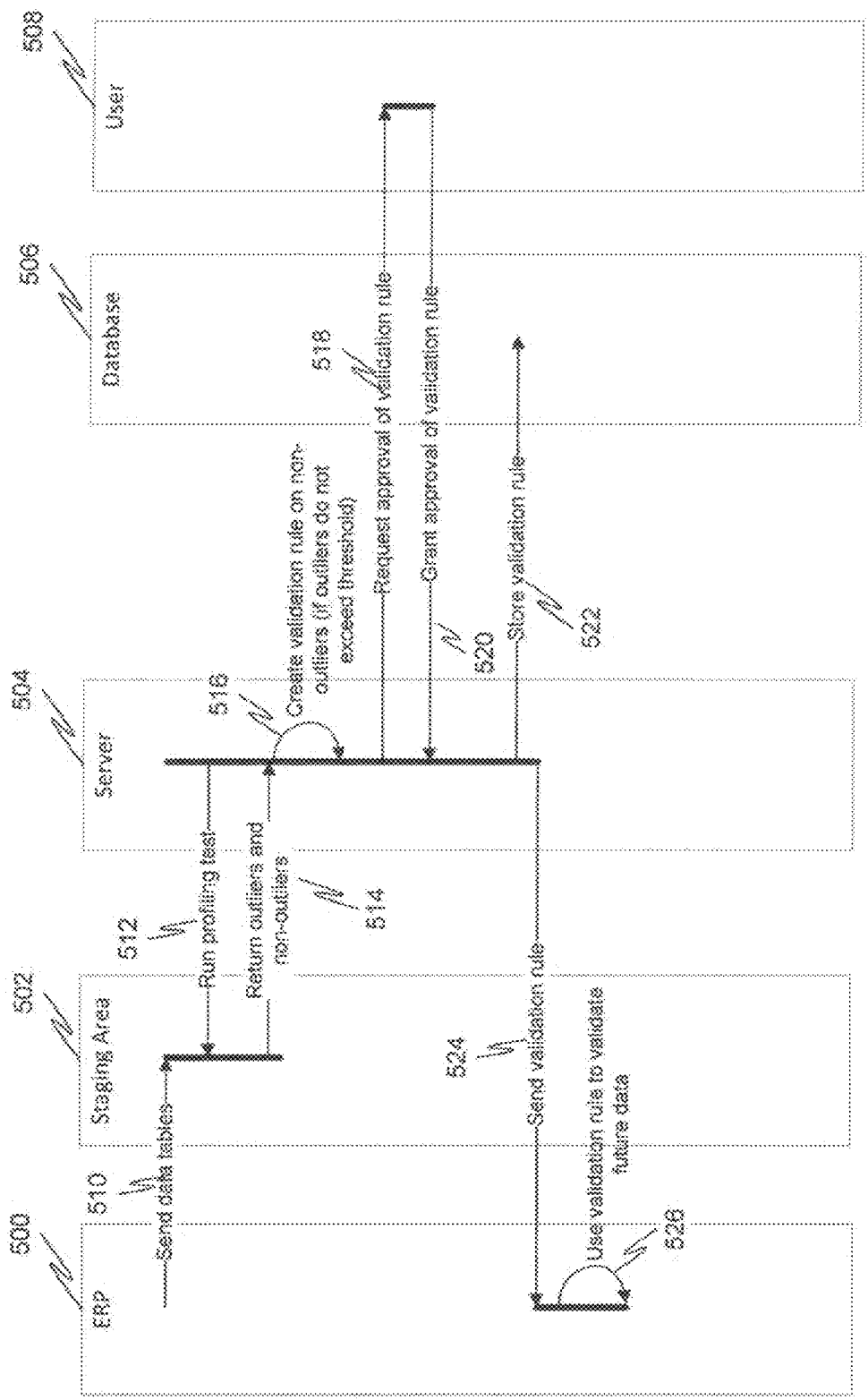
FIG. 5 is an interaction diagram illustrating a method of automatic rule generation in accordance with an example embodiment.

FIG. 5 is an interaction diagram illustrating a method of automatic rule generation in accordance with an example embodiment. There are five components depicted in this figure, ERP 500, staging area 502, server 504, database 506, and user 508. While these are depicted as different components, one of ordinary skill in the art will recognize that one or more of the components can be executed on the same hardware device. For example, the staging area 502, server 504, and database 506 could all be run on a single computer platform.

At 510, the ERP 500 sends data tables to the staging area 502. At 512, the server 504 runs a profiling test on the data tables, and more particularly on one column of one of the tables. At 514, outliers and non-outliers, as discovered by the profiling test, can be returned to the server 504. At 516, the server 504 can create a validation rule on the non-outliers (assuming the outliers do not exceed a threshold). At 518, the server 504 can request approval from the user 508 of the validation rule. At 520, approval may be granted. At 522, the validation rule can be stored in the database 506 and at 524 the validation rule can be sent to the ERP 500. At 526, the ERP 500 can use the validation rule to validate future data.

Figure 6:
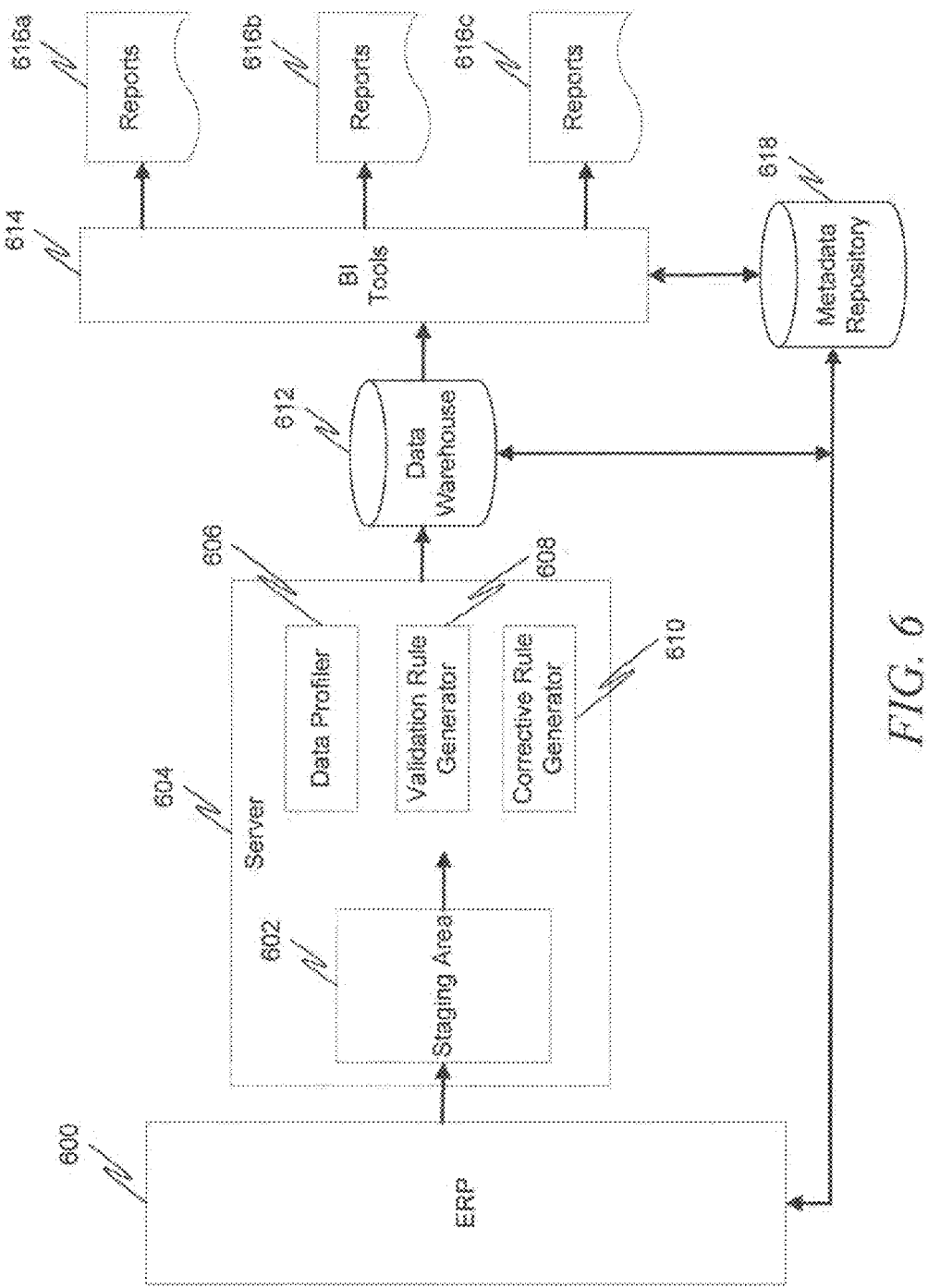
FIG. 6 is a diagram illustrating a system capable of automatic rule generation in accordance with another example embodiment.

FIG. 6 is a diagram illustrating a system capable of automatic rule generation in accordance with another example embodiment. Here, data is extracted from the ERP 600 and placed in a staging area 602. Profiling is then performed on the data in the staging area 602. Staging area 602 is located on a server 604. A data profiler 606 then profiles the data stored in the staging area 602, and a validation rule generator 608 than can then automatically generate validation rules based on this profiling. A corrective rule generator 210 may also be present to automatically generate corrective rules based on the profiling. The data can be stored in a data warehouse 612. Business intelligence (BI) tools 614 can then operate on the data to run reports 616a-616c. The BI tools 614 can also utilize a metadata repository 618 to run these reports. The ERP 600 can then also utilize the stored validation rules from the data warehouse 612 when receiving future data from data sources 602a-602c, using the rules to reject bad data (or even correct the bad data).

In another example embodiment, the rules generated may not simply be validation rules but additional corrective rules may also be generated. A corrective rules is a rule that modifies incorrect data so that it is correct. In the example given above for country data in an employee record, the system may generate a rule to modify "USS" in the data to "USA".

Figure 7:
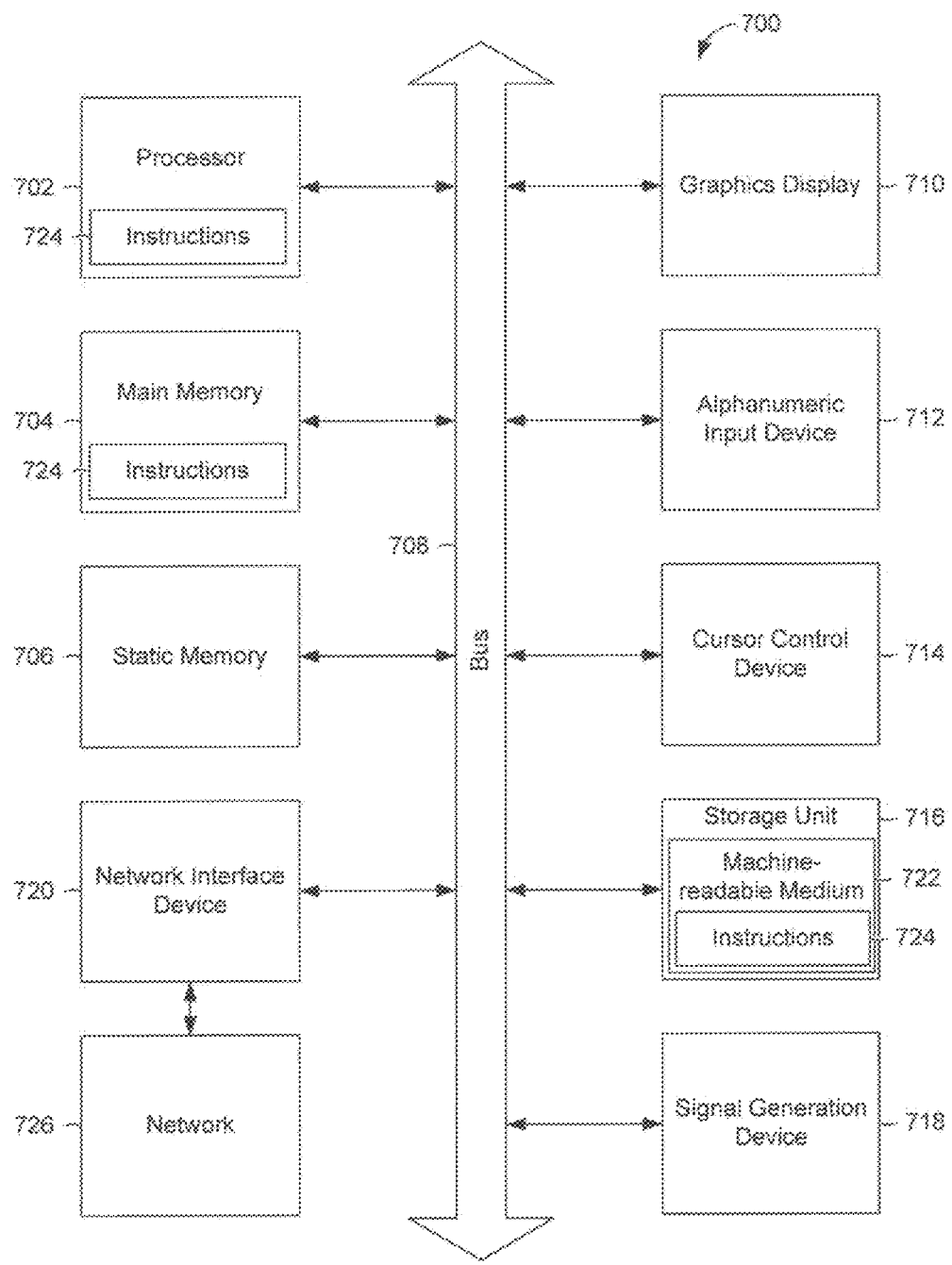
FIG. 7 is a block diagram of a computer processing system at a server system, within which a set of instructions, for causing the computer to perform any one or more of the methodologies discussed herein, may be executed.

FIG. 7 is a block diagram of a computer processing system at a server system, within which a set of instructions, for causing the computer to perform any one or more of the methodologies discussed herein may be executed.

Embodiments may also, for example, be deployed by Software-as-a-Service (SaaS), application service provided (ASP), or utility computing providers, in addition to being sold or licensed via traditional channels. The computer may be a server computer, a personal computer (PC), a table PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 700 includes processor 702 (e.g., a central processing unit (CPU), a graphics processing unit (GPU) or both), main memory 704 and static memory 706, which communicate with each other via bus 708. The processing system 700 may further include graphics display unit 710 (e.g., a plasma display, a liquid crystal display (LCD) or a cathode ray tube (CRT)). The processing system 700 also includes alphanumeric input device 712 (e.g., a keyboard), a cursor control device 714 (e.g., a mouse, touch screen, or the like), a storage unit 716, a signal generation device 718 (e.g., a speaker), and a network interface device 720.

The disk drive unit 716 includes machine-readable medium 722 on which is stored one or more sets of instructions 724 and data structures (e.g., software) embodying or utilized by any one or more the methodologies or functions described herein. The instructions 724 may also reside, completely or at least partially, within the main memory 704 and/or within the processor 702 during execution thereof by the processing system 700, the main memory 704 and the processor 702 also constituting machine-readable, tangible media.

The instructions 724 may further be transmitted or received over network 726 via a network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "machine readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. Program storage devices and machine readable medium are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of automatically generating data validation rules from data stored in a column of a table, the method comprising:
    determining, using a processor of a machine, a quantity of an outlier for the data by analyzing a profiling statistic for the data, the profiling statistic having a type and wherein the outlier is an element of the data that is numerically distant from other elements of the data;
    determining if the quantity of the outlier exceeds a predefined limit;
    automatically generating a data validation rule based on non-outliers detected in the data through the analysis of the profiling statistic, the generated data validation rule also being based on the type of the profiling statistic and the quantity of the outlier; and
    applying the data validation rule on data subsequently entered for the column, causing at least a portion of the data subsequently entered for the column to be rejected.

2. The method of claim 1, wherein the profiling statistic is percentage of null and the generated data validation rule is that the column cannot contain null values.

3. The method of claim 1, wherein the profiling statistic is percentage of blank and the generated data validation rule is that values must have a length greater than zero.

4. The method of claim 1, wherein the profiling statistic is percentage of zero and the generated data validation rule is that values must be greater than zero.

5. The method of claim 1, wherein the profiling statistic is data value distribution and the generated data validation rule is that the values must be contained in a set of values identified as non-outliers.

6. The method of claim 1, wherein the profiling statistic is data pattern distribution and the generated data validation rule is that the values must be contained in a pattern shared by values identified as non-outliers.

7. The method of claim 1, further comprising:
    providing the generated data validation rule to a user for verification prior to application of the rule.

8. The method of claim 1, wherein the table is located in a staging area coupled to an ERP system.

9. The method of claim 1 further comprising:
    compiling a set of all unique values in the column;
    identifying a column of another table containing at least a predefined percentage of the unique values in the set of all unique values; and
    creating a data validation rule that values in the column must be contained in the column of the other table.

10. The method of claim 1, further comprising automatically generating a corrective rule based on non-outliers detected in the data through the analysis of the profiling statistic, the generated corrective rule also being based on the type of the profiling statistic.

11. An apparatus comprising:
    a processor;
    a memory;
    a data profiler configured to:

determine a quantity of an outlier for data stored in a column of a table by analyzing a profiling statistic for the data, the profiling statistic having a type and wherein the outlier is an element of the data that is numerically distant from other elements of the data;

a validation rule generator configured to:

determine if the quantity of the outlier exceeds a predefined limit;

automatically generate a data validation rule based on non-outliers detected in the data through the analysis of the profiling statistic, the generated data validation rule also being based on the type of the profiling statistic and the quantity of the outlier; and send the data validation rule to an Enterprise Resource Planning (ERP) system to apply the rule on data subsequently entered for the column, causing at least a portion of the data subsequently entered for the column to be rejected.

12. The apparatus of claim 11, further comprising:

a corrective rule generator configured to automatically generate a corrective rule based on non-outliers detected in the data through the analysis of the profiling statistic, the generated corrective rule also being based on the type of the profiling statistic; and send the corrective rule to a component that modifies the data based on the corrective rule.

13. The apparatus of claim 11, wherein the data is stored in the ERP system.

14. The apparatus of claim 11, wherein the data is stored in a staging area outside of the ERP system.

15. The apparatus of claim 11, further comprising a user interface configured to prompt a user for approval of the data validation rule prior to the sending of the data validation rule to the ERP system.

16. A non-transitory computer-readable storage medium comprising instructions that, when executed by at least one processor of a machine, cause the machine to perform operations of automatically generating data validation rules from data stored in a column of a table, the operations comprising:

determining a quantity of an outlier for the data by analyzing a profiling statistic for the data, the profiling statistic having a type and wherein the outlier is an element of the data that is numerically distant from other elements of the data;

determining if the quantity of the outlier exceeds a predefined limit;

automatically generating a data validation rule based on non-outliers detected in the data through the analysis of the profiling statistic, the generated data validation rule also being based on the type of the profiling statistic and the quantity of the outlier; and applying the data validation rule on data subsequently entered for the column, causing at least a portion of the data subsequently entered for the column to be rejected.

17. The non-transitory computer-readable storage medium of claim 16, wherein the operations further comprise:

providing the generated data validation rule to a user for verification prior to application of the rule.

18. The non-transitory computer-readable storage medium of claim 16, wherein the operations further comprise:

compiling a set of all unique values in the column;

identifying a column of another table containing at least a predefined percentage of the unique values in the set of all unique values; and creating a data validation rule that values in the column must be contained in the column of the other table.

19. The non-transitory computer-readable storage medium of claim 16, wherein the operations further comprise automatically generating a corrective rule based on non-outliers detected in the data through the analysis of the profiling statistic, the generated corrective rule also being based on the type of the profiling statistic.

* * * * *